United States Patent [19]

Holley

[11] Patent Number: 5,235,781
[45] Date of Patent: Aug. 17, 1993

[54] PAPER BRIQUETTES CONTAINING SEED AND FERTILIZER

[76] Inventor: Carl A. Holley, 14315 Tall Oaks, Riverview, Mich. 48192

[21] Appl. No.: 628,105

[22] Filed: Dec. 17, 1990

[51] Int. Cl.⁵ .............................. A01C 1/04
[52] U.S. Cl. ................................. 47/56
[58] Field of Search ......................... 47/56

[56] References Cited

U.S. PATENT DOCUMENTS

| | | | |
|---|---|---|---|
| 2,243,857 | 6/1941 | Fischer | 47/56 |
| 3,583,099 | 6/1971 | Fata | 47/56 |
| 4,318,248 | 3/1982 | Muldner | 47/56 |
| 4,584,790 | 4/1986 | Gaughen | 47/56 |

Primary Examiner—Ramon S. Britts
Assistant Examiner—Joanne C. Downs
Attorney, Agent, or Firm—William J. Ruano

[57] ABSTRACT

A compacted agglomerate in the form of a pillow-shaped briquette. It contains finely pulverized paper and a fertilizer in the form of a granular powder or liquid. The pulverized paper may be paper dust. A dye may also be added to provide a more colorful product.

1 Claim, No Drawings

PAPER BRIQUETTES CONTAINING SEED AND FERTILIZER

BACKGROUND OF THE INVENTION

Seeding a bare patch in a lawn is a problem. If grass seed is spread, it must be fertilized and kept moist to insure germination and growth. Adding the proper amount of fertilizer is a very difficult problem for the ordinary person, but keeping the seed uniformly moistened is even more of a problem.

A blend of finely pulverized newspaper, seed and granular fertilizer is very effective as long as the seeds and fertilizer granules are uniformly distributed in the pulverized newspaper. I have found that during shipping, the seeds and granular fertilizer segregate and settle to the bottom of the container. Another big disadvantage of this material is its bulkiness and the difficulty of spreading on the bare spots of the lawn.

SUMMARY OF THE INVENTION

My solution is to blend the seed into the finely pulverized paper along with fertilizer which can be in the form of granules, powder or liquid and to produce the blended material into large pellets or briquettes.

DESCRIPTION OF THE PREFERRED EMBODIMENT

The briquettes can be produced on a roll type biomass briquetter, but they could also be produced in a tableting press or even with an extruder. The briquette may be of any shape, such as pillow-shaped. Each briquette has the proper amount of both seed and fertilizer and can be easily spaced out in the bare area of the lawn. As soon as the briquette is watered it begins to expand and disintegrate. The paper "holds" the water which provides the moisture necessary for the seed to germinate and the close proximity of the fertilizer provides the nutrients required for growth.

A good relationship of the seed to paper is 1% seed, but having up to 5% seed is satisfactory in some cases. A fertilizer quantity of 5% 8-8-8 fertilizer has been found to be satisfactory, but this quantity can be much higher, and up to 15% has been found to be satisfactory. The fertilizer can be any strength that is commercially available.

I have found that many other seeds can be utilized in this carrier, such as, wild flowers, crown vetch for planting highway cuts, pine trees and many other seeds.

The briquettes can be utilized with the fertilizer but without seeds as a mulch for shrubs and bushes. In this application the paper holds the moisture and slowly releases the fertilizer to the roots of the shrubs or bushes. The finely pulverized paper can be paper dust from a book binding operation or from a paper deinking operation.

The briquettes can be any small size. I have utilized a $1'' \times 2'' \times \frac{1}{2}''$ briquette, but a smaller size, such as, 1" square by $\frac{1}{4}''$ thick will perform satisfactorily. I have even made a corrugated compacted sheet which I broke up into pieces which were $\frac{1}{4}'' \times \frac{1}{4}''$ in size. I have found that by adding a green color, the briquettes are perceived to be ready to grow.

While I have illustrated and described several embodiments of my invention, it will be understood that these are by way of illustration only and that various changes and modifications are contemplated in my invention within the scope of the following claims.

I claim:

1. A paper briquette for use in agricultural areas comprising a pillow-shaped agglomerate of a size of about $1'' \times 2'' \times \frac{1}{2}''$, comprising finely pulverized paper containing about 1% to 5% seed, about 5% to 15% fertilizer, said seeds and fertilizer being uniformly distributed in said finely pulverized paper, said briquette being colored by green dye.

* * * * *